(12) United States Patent
Lehner

(10) Patent No.: US 6,582,176 B1
(45) Date of Patent: Jun. 24, 2003

(54) SUPPORTING MEMBER WITH ALTERNATING POSITIONS AND ITS USE

(76) Inventor: Guido Lehner, Unionstrasse 2, CH-9403 Goldach, Schweiz (CH)

( * ) Notice: Subject to any disclaimer, the term of this patent is extended or adjusted under 35 U.S.C. 154(b) by 0 days.

(21) Appl. No.: 09/601,030

(22) PCT Filed: Jan. 26, 1999

(86) PCT No.: PCT/CH99/00034
§ 371 (c)(1),
(2), (4) Date: Aug. 10, 2000

(87) PCT Pub. No.: WO99/37501
PCT Pub. Date: Jul. 29, 1999

(30) Foreign Application Priority Data

Jan. 26, 1998 (CH) .................................. 179/98
May 6, 1998 (DE) ........................... 198 20 074

(51) Int. Cl.⁷ .................................................. B60P 1/64
(52) U.S. Cl. ...................................................... 414/498
(58) Field of Search .................................. 414/498, 500, 414/548

(56) References Cited

U.S. PATENT DOCUMENTS

| | | | | |
|---|---|---|---|---|
| 1,049,210 A | * | 12/1912 | Cole, Jr. ...................... | 414/498 |
| 2,656,942 A | * | 10/1953 | Helms ......................... | 414/498 |
| 3,266,774 A | * | 8/1966 | Goyarts ....................... | 414/498 |
| 3,476,275 A | * | 11/1969 | Cowlishaw et al. ......... | 414/498 |
| 3,520,433 A | * | 7/1970 | Blackburn .................... | 414/498 |
| 3,541,598 A | | 11/1970 | Dousset ....................... | 214/392 |
| 3,868,088 A | * | 2/1975 | Reeves ......................... | 414/498 |
| 3,995,760 A | * | 12/1976 | Burgdorf et al. ............. | 414/498 |
| 4,378,191 A | | 3/1983 | Sato ............................. | 414/540 |
| 4,522,550 A | * | 6/1985 | Whitehouse ................. | 414/498 |

FOREIGN PATENT DOCUMENTS

| | | | | |
|---|---|---|---|---|
| DE | 456468 | * | 2/1928 | |
| DE | 1927497 | * | 12/1970 | |
| DE | 2239718 | * | 2/1974 | |
| DE | 4240125 | * | 6/1994 | |
| GB | 1168902 | * | 10/1969 | ................. 414/498 |
| WO | WO 97/13654 | | 4/1997 | ............ B60P/1/64 |

* cited by examiner

Primary Examiner—James W. Keenan
(74) Attorney, Agent, or Firm—Karl Hormann

(57) ABSTRACT

Supporting members with alternating positions (5) are disclosed for raising and lowering bulky transport goods (2). The supporting members (5) are pivotally arranged on a transport structure and can be connected with auxiliary pivoting means. The structure can be lowered onto the floor (9) or into a low position and brought back into a high position by corresponding pivoting movements (6) of the supporting members (5). The supporting members (5) are preferably designed as knee links and their axes of articulation are parallel to the vehicle axles. This new solution can also be implemented by means of centering cones and centering funnels in combination with a device for alternatively moving a vehicle between a standing position and a transport position.

10 Claims, 12 Drawing Sheets

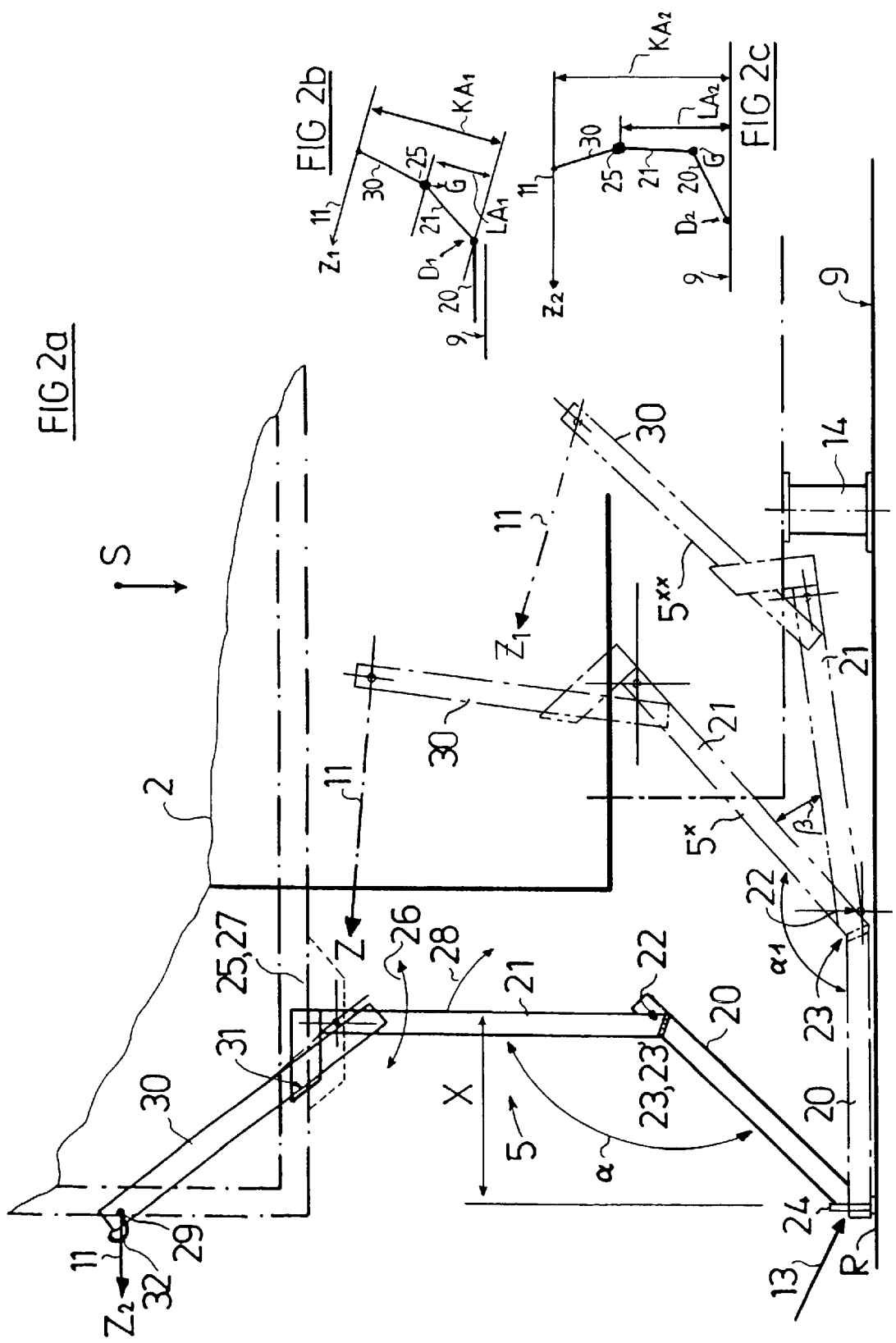

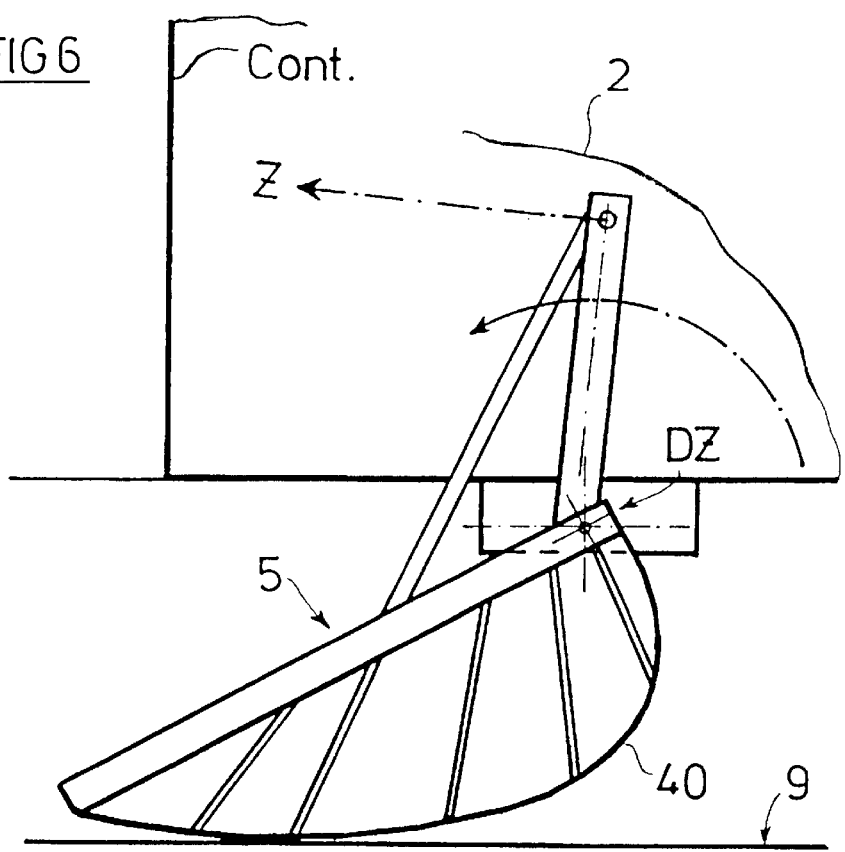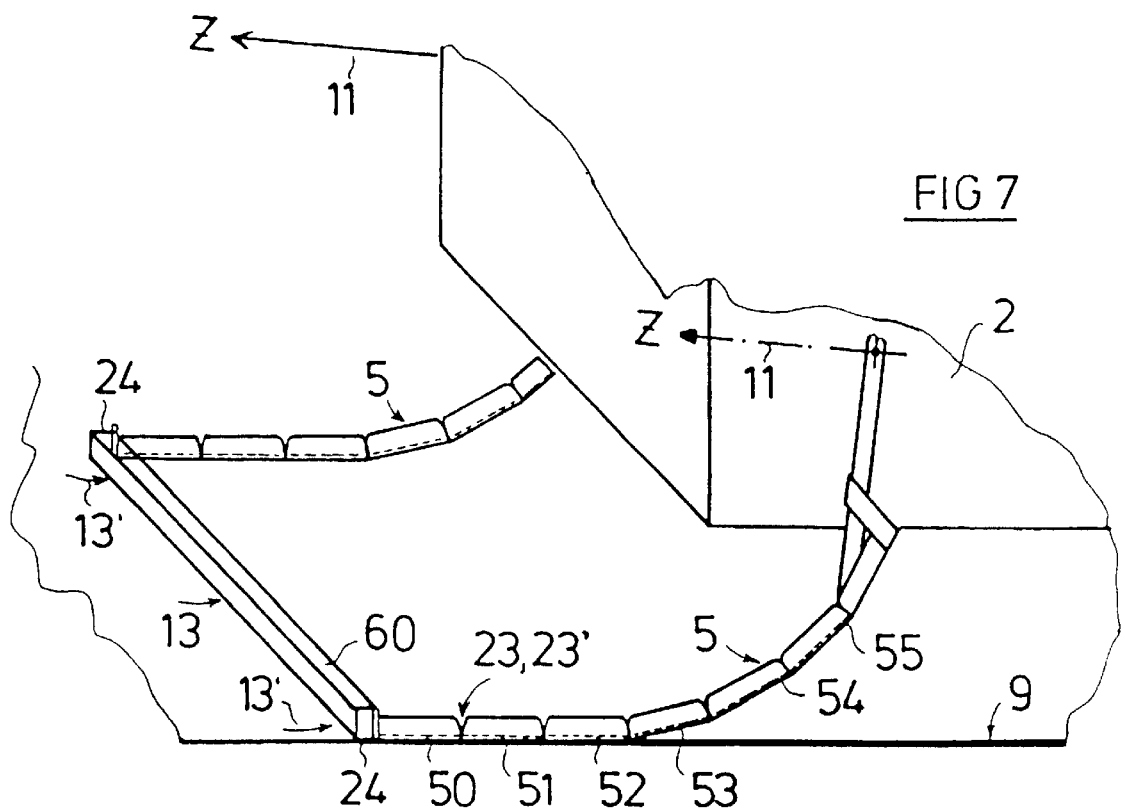

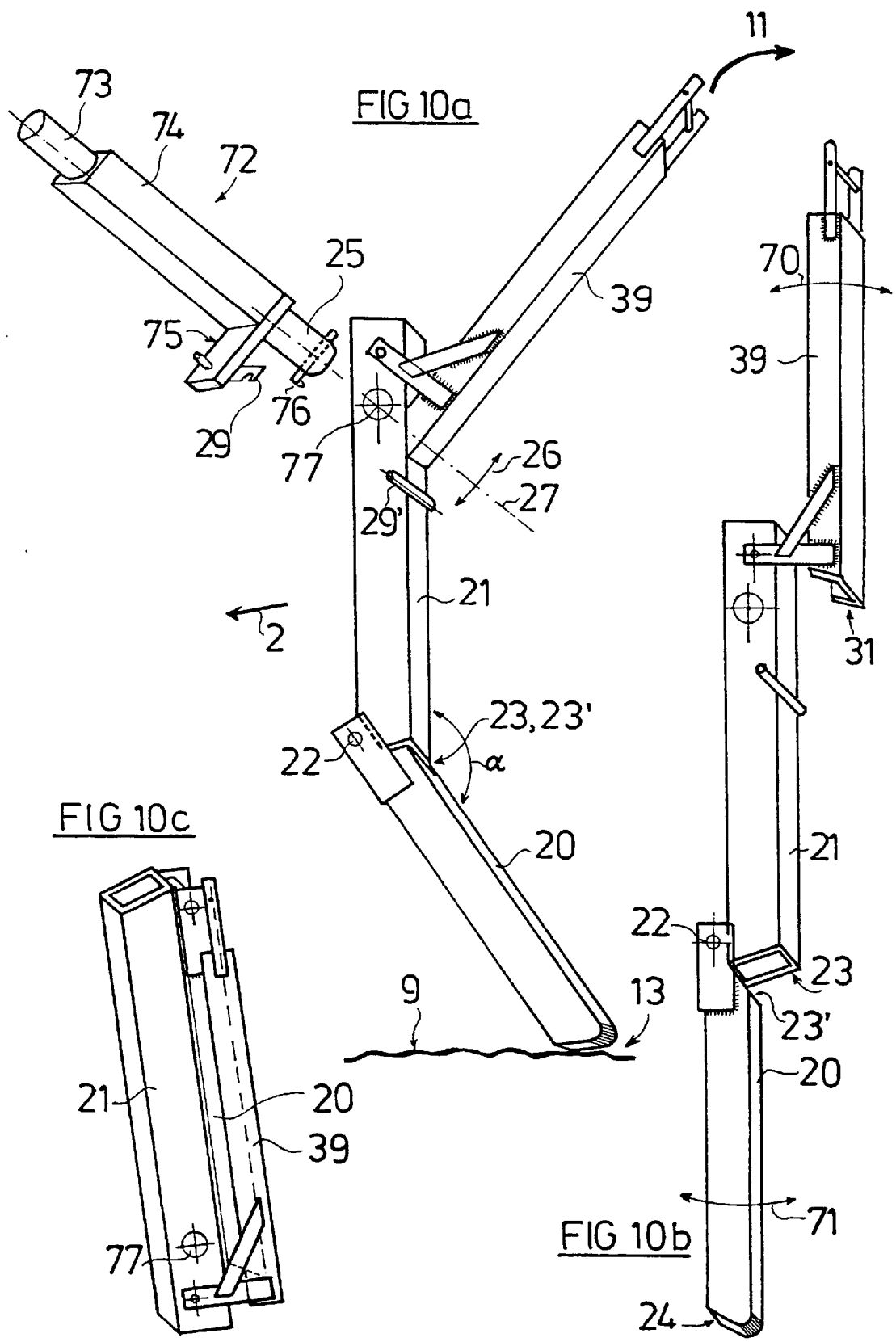

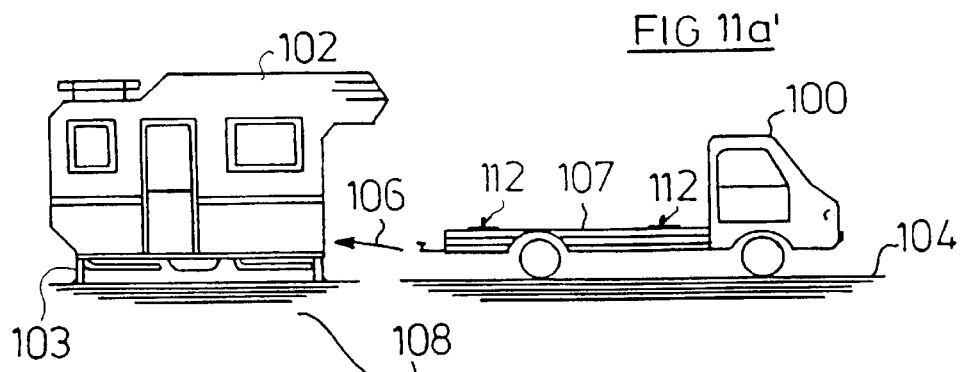
FIG 11a'
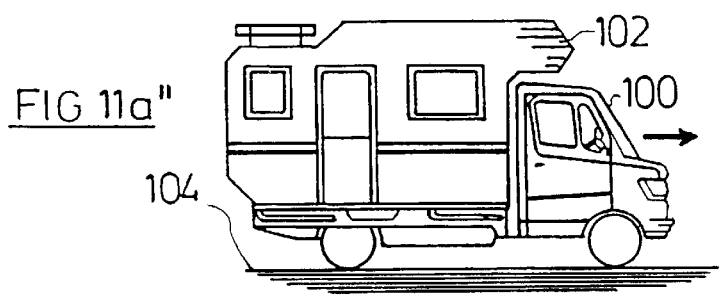
FIG 11a"
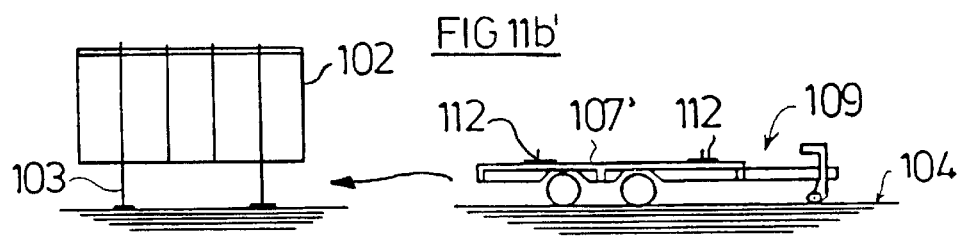
FIG 11b'
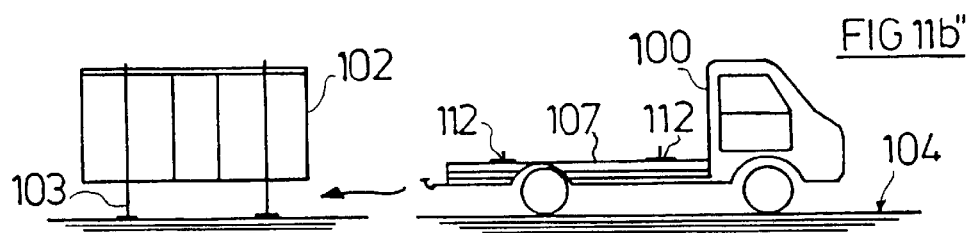
FIG 11b"
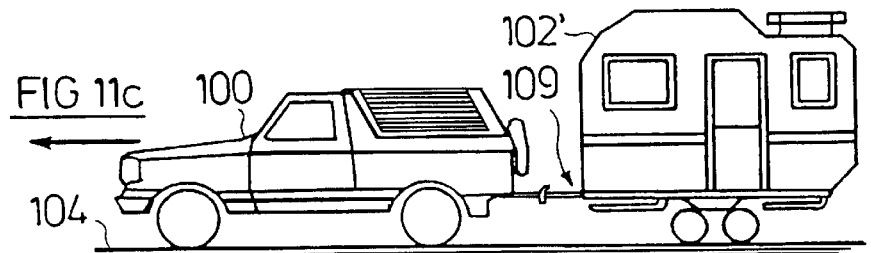
FIG 11c

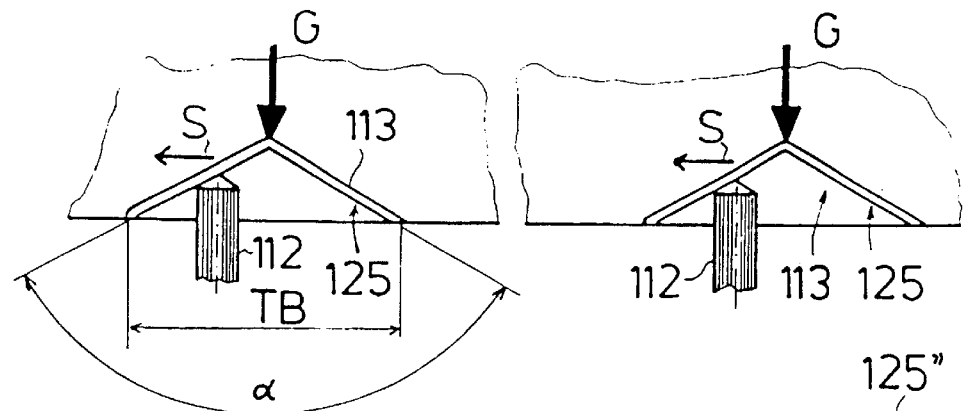
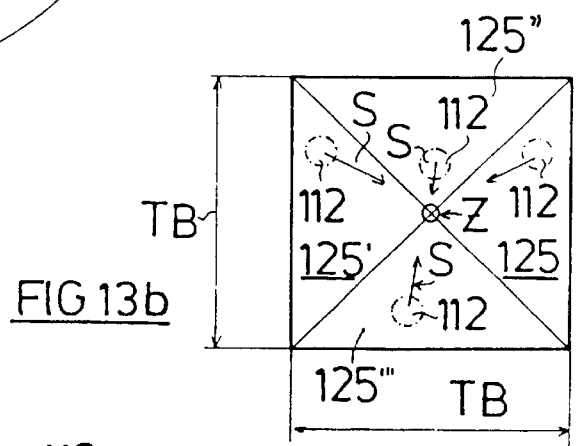
FIG 13a
FIG 13b
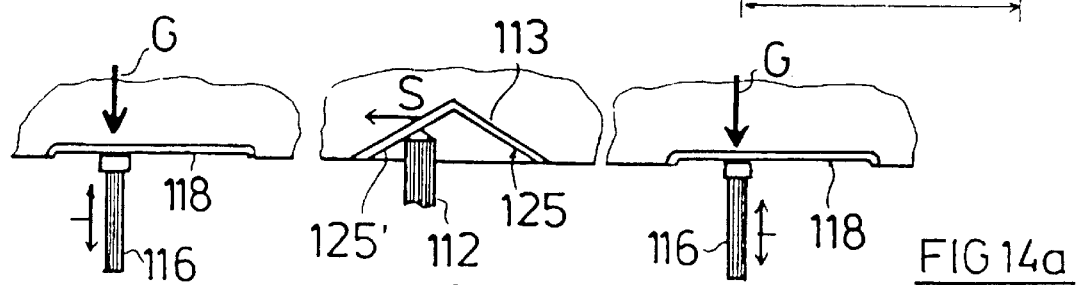
FIG 14a
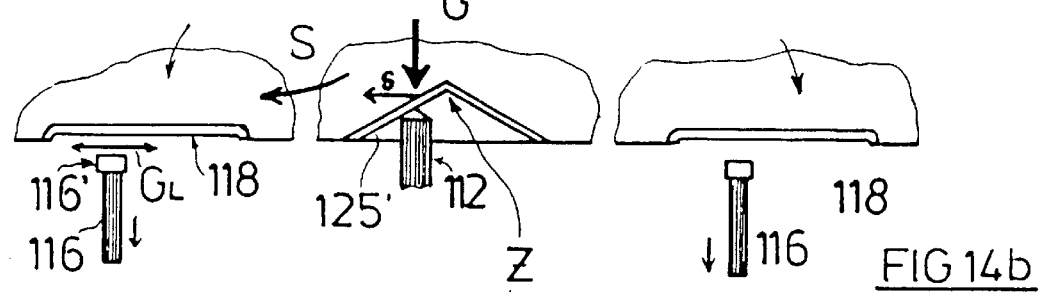
FIG 14b
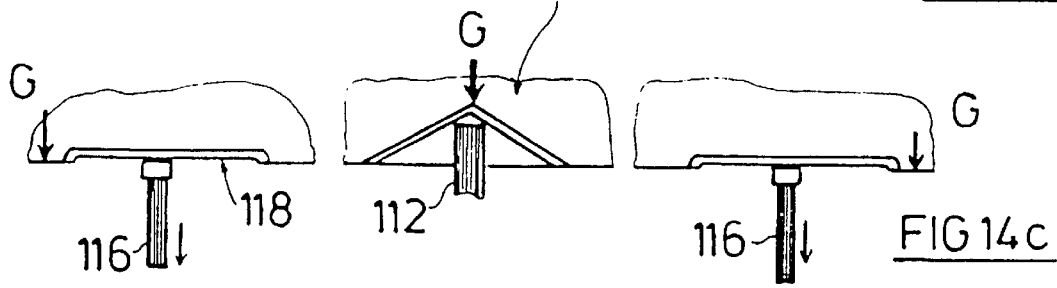
FIG 14c

SUPPORTING MEMBER WITH ALTERNATING POSITIONS AND ITS USE

BACKGROUND OF THE INVENTION

1. Field of the Invention

The invention, in general, relates to a change-over support for facilitating the transfer of a load between a parking or storage position and a transport vehicle and, more particularly, to a change-over support of the kind which permits moving the load between low and high positions with relatively small forces.

2. The State of the Art

The invention is based upon a change-over support of the kind described in U.S. application Ser. No. 09/051,328 which is expressly incorporated by reference herein. The object of the apparatus disclosed by U.S. application Ser. No. 09/051,328 is to enable a person at any location and without special devices, such as cranes or fork lifts, to move a load from a vehicle to a storage or parking position. The apparatus provides for a lifting and lowering device, including four distributed points of engagement, for synchronously lifting and lowering a load. Also proposed is a combination of an engaging funnel and centering cone for grasping and pushing the load under its own weight as well as for a defined placement thereof on the loading bed. The lifting and lowering device comprises four hydraulic cylinders mounted on a frame and energized from a hydraulic pump by a control. Lifting and lowering of a container or of a pallet or any kind of load takes place substantially vertically of the frame rather than to the ground. The container, for instance, is moved to a desired location by a motorized vehicle and lifted off the frame by a lifting and lowering device of short stroke of about 8 to 12 inches, and ground posts are then used in a vertical disposition. The four cylinders are thereafter retracted with the container being placed on the ground posts at the same time. The height of these ground posts is somewhat greater than three feet. Thereafter, the vehicle may withdraw from the supports without the container. The operation is reversed for loading the container onto a vehicle. Such containers have proven themselves in practical applications. To place a container at a loading site takes about one minute. Following loading, the container may be moved to another site for unloading and subsequent removal to yet another location. Changing of all or part of the loaded goods from a vehicle onto a floor, rather than from the vehicle onto a support structure, would in many applications be of advantage. It should also be possible without crane or fork lift to lift a platform or container from its low position to an elevated position for loading onto a vehicle. One way of accomplishing this is by hydraulic struts of the kind disclosed, for instance, by U.S. Pat. No. 3,541,598. Pallets or containers are usually structured in a cost-efficient manner and function independently of a vehicle and as a rule without their own power supply. Any motor and its handling devices are usually mounted on the vehicle. The four hydraulic struts may be supplied with pressure fluid from the vehicle. This would, however, require connecting and disconnecting hydraulic hoses for each operation. Each time there is a potential for loss of hydraulic fluid into the environment. One of the main purposes of containers is to provide transport space which is as large and inexpensive as possible and which while being of low tare weight accommodates a maximum net weight. Hydraulic cylinders which are strong and long and which do not buckle suffer from the drawback of being quite heavy. Hydraulic cylinders used as support struts have not been widely accepted.

OBJECTS OF THE INVENTION.

It is an object of the invention to make it possible without ancillary hoisting equipment to move loaded goods, whether on platforms such as transport structures, pallets or containers, into elevated or lowered positions relative to ground. Primarily, but by no means exclusively, the hoisted position is to be useful for mounting on or dismounting from a vehicle, and the lowered position is to serve as short or long term storage or parking at a given location. A further task of the invention is in a simple manner to combine the transition between a parking position and a vehicle.

SUMMARY OF THE INVENTION.

In accordance with the invention the change-over support comprises a force arm extending as a pulling lever upwardly from a joint shaft and constituting a lever variable relative to the ratio of the length between load arm and force arm, the load arm being relatively shortened for overcoming situations of maximum tractive forces.

A first experimental mechanism has demonstrated as an important aspect of the invention, an interaction of movement of favorable lever ratios not hitherto used in practical applications. The interaction is the result, on the one hand, of the joint function and, on the other hand, it is the mechanical advantage of the lever transmission. In an actual embodiment three primary concepts may be realized at relatively little complexity:

Structuring the change-over support as a rolling rail or skid in an idealized form;

Structuring the change-over support as a knee joint;

Structuring the change-over support as a multiple joint.

In each case, it is possible with little material expenditure to facilitate the lifting and lowering of a load relative to ground by means of the mechanical advantage derived from a lever transmission. With relatively small force, heavy weights may thus be lowered to ground and lifted again to an elevated position by means of a traction device of the vehicle. It has been possible with the novel apparatus by the interaction of forces between vehicle and load to make use of the lever principle in a particularly advantageous manner. As is well known, all lever shears systems require extremely large forces in extreme positions. By contrast, the novel arrangement optimizes the ratio of load arm to force arm in the least favorable dispositions in terms of force. Forces and loads are optimally taken into consideration on the part of the vehicle.

A large number of embodiments are possible in accordance with the invention. Preferably, the change-over supports are structured as struts or rocker arm supports with one or more knee or toggle joints. It is particularly advantageous to align the shafts of the joints parallel to the axles of the vehicle. In this manner traction forces acting in the driving direction of the vehicle may generate, or be converted to the requisite pivoting or tilting forces. Consequently, for purposes of the vertical movement, the motor vehicle need no longer be placed under the loading structure, in contrast to the lifting and lowering device in accordance with U.S. application Ser. No.: 09/051,328 referred to supra. Advantageously, every knee joint support consists of at least two arms connected by a joint. The internal knee angle of the load arm may be limited by abutments to angles larger than 90°. Moreover, each strut may be provided with two or more joints with each knee angle of the load arm being limited by abutments. The change-over of the load from a parking or storage position to the vehicle may be carried out in the manner disclosed by U.S. application Ser. No.: 09/051,328. By contrast, however, complete or partial lowering of the load to ground is carried out in accordance with the invention in the manner to be described.

As previously mentioned, the change-over supports may in an idealized case be structured as a rolling rail or skid provided with a traction arm which is extensible beyond the connecting joint of the structure. The rolling rail structure offers the advantage that during lowering and lifting movement the forces are changing continually and subject the drive system to a uniform load. The knee support or joint is advantageous in that the struts may be folded to the shortest possible dimension. This is of utmost importance in respect of the vehicle. To this end, the joints are structured to be collapsible in a direction opposite to the tractive force. The forces from the pivoting devices may be transmitted in many different ways as, for instance, by hand winches, lever spanner and the like. The pivoting movement may be carried out by pushing or pulling forces generated by mechanical, electrical or hydraulic pivoting devices. In accordance with a very simple embodiment, the struts at both sides of the structure are connected by parallel links to coordinate the movement of all struts where a load has to be lowered or lifted in a parallel orientation relative to ground. The pivoting devices are structured as motorized or hydraulic means and are rigidly mounted on the motor vehicle. In this connection, the motor vehicle is advantageously provided with a shift prevention device for insertion between the struts and the motor vehicle. It counteracts the tractive force for lifting and lowering the structure so that neither the motor vehicle nor the transport structure may horizontally shift as a result of the pivoting forces. The shift prevention device may be a movable shaft. Alternatively or additionally, it may be operated with a vehicle support. Moreover, the pivot devices are advantageously provided, at least in part, with a tow cable advantageously mounted at the rear end of the vehicle. Even if the motor vehicle is not aligned precisely with the structure forces acting slightly laterally may be absorbed by the cable. In order to prevent an excessive load on the vehicle frame the pivoting devices as well as the vehicle support should have a common point of engagement on the vehicle. The load bed support may be structured as a spring, for instance a pneumatic spring, so that during lowering of the structure onto the ground at least the terminal part of the movement may act as an energy storage for facilitating subsequent. An optimum solution results from a shift prevention device being arranged on both sides of the vehicle and from the pivot devices being arranged on the longitudinal center axis of the vehicle. In accordance with a further embodiment, one or more intermediate levels or decks may be arranged within the structure or container or structure which may be similarly lifted or lowered by the novel change-over support.

The novel arrangement operates in two directions and relates to two basic manipulations for which hitherto no practical solutions had been found, particularly for joint action. This is the complete lowering of a container to the ground without the aid of a crane, and the loading of cargo anywhere, also without a crane or fork lift. It has been found through experience, that one individual may move several hundred kilograms with simple utensils. Special utensils are, however, required at weights in excess of one ton. This is all the more true at weights of perhaps 1 to 3 tons or more and where the object to be moved is also very large. It has been recognized that it is simple to deposit a load where the vehicle is itself provided with lifting equipment. Merely lifting and lowering also constitutes a simple manipulation. The situation changes, however, if a structure of 2 to 4 tons or much more weight and a length of several yards, and deposited anywhere on the ground needs to be placed on a load bed with a precision in the millimeter range. The purpose of the novel arrangement also resides in the fact that the load when lowered may be captured and shifted under its own weight and deposited on a load bed in a precisely defined position. As for loading use is made of the total weight, the weight as such is no longer of any importance. The load may be quickly changed from a vehicle to a parking or storage position. Also, the structure of a given kind or a loaded one may be quickly exchanged for another or empty one. The invention may be practiced with light vehicles as well as heavy vehicles, even with a recess or pit in a ground surface.

Furthermore, the novel arrangement is characterized by modular construction. A first module is structured as a change-over support offering parking positions as well as a lifting and lowering device. A second module is structured as a transverse support or group of transverse supports, and may be affixed as a structural unit to the underside of a structure. The two modules, i.e. the change-over support module and the structural module may be economically manufactured in large series and may be furnished to vehicle and container manufacturers. It has been found that at the same time many problems in the current state of the art may be solved by making use of the dead space for the resiliency of the vehicle frame, particularly in light vehicles. In particular, the change-over support may be of light construction requiring only a slight reduction of the net weight. The change-over support is particularly advantageous for vehicle trailer, but it may also be mounted on a motor vehicle. The change-over support is structured as a platform mounted on the structure and has associated therewith a short-stroke lifting and lowering device. In an especially preferred embodiment, the change-over support is provided with two longitudinal and two transverse braces which are longitudinally and transversely adjustable to complement different vehicular frames. The aggregate for the motor drive, the control tubes and the control elements may be mounted on an additional center brace. The longitudinal and transverse braces may be structured as interlocking profiles with the longitudinal braces being provided with a number of recesses for insertion to any desired width relative to the longitudinal braces. In this manner it is possible to set, within certain maximum and minimum values, the width to any desired dimension. Any protruding ends may be removed by the manufacturer of the vehicle.

Preferably, the structure is provided with at least two rigidly mounted transverse supports for selectively mounting floor support posts either as rigid posts or as rocker arm posts or folding struts so that the structure may either be quickly changed from a parking or storage position to being part of the vehicle, or lowered to ground. It is also possible to provide three or more transverse supports. A lock may be actuated by the motor drive for releasing or opening the connection. The transverse supports of the structure are each provided with preferably planar support surfaces and a center aligning funnel, a lifting device being associated with each support surface and a aligning bolt being associated with the centering funnel. Lifting devices and centering bolts are arranged on the change-over support. In case three or more transverse supports are used, a lifting device, preferably structured as a hydraulically actuable cylinder may be associated with each support surface. A central centering device is arranged between two lateral transverse supports. Accordingly, there will preferably be a total of two centering devices for one structure. Furthermore, in accordance with the invention, side covers may be attached to the transverse and longitudinal braces. The length of the transverse and longitudinal braces is adjusted or shortened to suit an actual vehicular frame. In accordance with the invention any loading bed or structure may either be rigidly supported on the bottom or connected to a vehicular frame which may be moved under the structure. In that case the platform is placed on the vehicular frame by a lifting and lowering device mounted on the vehicular frame or it may be lifted off the vehicular frame for transportation by a light motor vehicle. According to the invention, the structure or the platform including any kind of structure functions as a load and must comply with given traffic regulations. The changeover support is preferably of lightweight construction. The inventor has also recognized that significant areas of cargo handling have hitherto not been accorded sufficient attention. Among these are the transfer of bulky and light individual pieces and, above all, the time factor. Even large volumes are rapidly moved over great distances. However, problems emerge only when the goods have arrived at their point of destination, since the acceptance of large volumes in many cases cannot be planned in advance. The vehicle must then remain idle at the point of destination for a considerable time so that the vehicle is in fact converted into a very expensive storage facility. The invention solves the time problem in an economical manner, by suggesting a combination of different points of emphasis: In the case of light goods the vehicular frame may be moved between sites by a small truck (pick up trucks) of 3.5 or 7 tons or by a Jeep® of appropriate traction. In this connection, the vehicle may be built to include the elements of the invention. The loading bed may be deposited on the ground by simple posts as shown in U.S. aplication Ser. No.: 09/051,328 or it may be connected to a vehicular frame. The vehicular frame may be moved below a platform rigidly mounted on the ground. The vehicular frame is provided with a short-stroke lifting and lowering device so that the driver may by himself carry out the change over from parking or storage position to the vehicle in a simple manner, without any auxiliary equipment (such as a crane, fork lift, etc.) and free of any hazard, since the lifting and lowering device need be adjusted only by a stroke of about 12 to 16 inches, i.e. the approximate length of a foot. In a normal operation the lifting and lowering device only functions to change the platform from a parking or storage position to the vehicle and vice versa. For that reason, as well as being integrated into the vehicular frame it is much more cost-efficient than conventional cargo transfer devices such as cranes, fork lifts and the like. A motorized lifting and lowering device engages support points and is preferably structured for lifting as well as lowering by the support points. To this end, four lifting and lowering devices are distributed over the base surface of the container and are provided with support points for engagement by controllable lifting elements such as pneumatic cylinders, hydraulic cylinders, pneumatic springs, spindle drives or threaded shafts. For higher demands it is also possible, for leveling the container, synchronously to adjust the motors in pairs or individually. However, the lifting and lowering device may also be provided with motorized or manually operable lever shears lifts or with a cable winch including a support mast. Preferably, the support points are arranged in the outer quarter sections of the container and are structured as transverse supports with the support points being placed at the outer end sections of the transverse supports. Preferably, the support points are formed on those transverse supports which mount or receive the struts by way of horizontal support arms. It is particularly efficient to arrange a centering funnel in the center section of each of the two transverse supports, for accepting a centering bolt arranged on the vehicular frame or for moving and placing the container on the vehicular frame in a defined position. The vehicular frame may be a twin-axled trailer provided with two support braces having hoists associated therewith, preferably with two hydraulic cylinders each, as well as with a centering device arranged in the center of each support brace. The two support braces are arranged in the two outer quarter sections of the container. However, trailers built with one, two or three axles are also possible. In a particularly preferred embodiment the platform as well as the support points are symmetrically structured so that they may be used in the same way in both towing directions.

For applications as universal as possible, it is proposed to provide crane hooks at the ceiling of the container in two transverse planes which include the support points or support braces. Also, between the support points, engagement surfaces and a space for accepting a fork lift should be provided. A container structured in this fashion may also be transported or loaded onto railroad wagons or large trucks in a manner well known. A mechanically or hydraulically actuable retaining device for preferably engaging the centering funnel and structured as a snap or spring-loaded lock, is arranged between the container and the vehicular frame. If the container is frequently to be placed into very tight spaces, it is recommended to provide rollers or casters at the supports which may be raised or lowered, as required. The container may first be moved by a towing vehicle into an optimum position. Any precise placement, including, for instance, rotation by 90°, may subsequently be carried out manually by means of the rollers. This is of great advantage in very tight spatial conditions, as almost always prevail, for instance, at construction sites or exhibitions or when moving furniture in an urban environment. The surprising advantage resides in the fact that an enterprise need no longer keep, for instance, 15, 30 or more vehicles but just a few vehicles or towing vehicles. Since the costs of a loading surface including appropriate structures or corresponding containers are only a fraction of those of a motor vehicle, the loading surfaces or containers may be cost-efficiently left at a destination point until they have been completely emptied. Many craftsmen customarily move substantial portions of building materials and required tools between their plant or office and a construction site on a daily basis or even more frequently. The exchangeable container system would avoid many of those moves. The number of required containers, vehicular frames and towing vehicles depends upon given circumstances. The invention makes possible many other advantageous applications. For instance, the structure may be built as a shed supported on preferably vertically adjustable support legs for the stationary duration. For changing to a subsequent construction site such shed may be moved on a vehicular frame by a light motorized vehicle. The structure may be adapted to given circumstances and in accordance with a further advantageous embodiment is built as a container used as a transport vessel between different locations. Such container may, for instance, be loaded at a producer of light agricultural products, for furniture removals, for package mail, for baskets for delicate goods, for beverages and market kiosks, or for light industrial goods such as insulating materials. It may be placed on a vehicular frame and then be transported over at least part of the distance to a destination point by a light motor vehicle. For some applications it is advantageous to permit the height of the transport structure to be changed. The loading bed could thus be placed in an optimum position and the height of each support could be adjusted to the terrain or to move one or more platforms into a horizontal disposition. Also, one or more platforms may be structured for direct placement on a loading bed of a transport means or on the ground, such that over large distances, for instance, individual pieces are transported by railroad, for instance, where transfer takes place by crane hooks or fork lifts. The structure may also be set up as an exhibition container such that light parts required for an exhibition booth are transported in it, and the platform and its superstructure are then used as the exhibit or part of an exhibit or sales booth.

The invention may be practiced in many different ways for heavy as well as for light goods. The useable working surface of the alignment funnels and of the support plates is about equal in size. Since the accuracy of maneuverability of a vehicle is about 8 to 29 inches, it is proposed to restrict the lateral measurements of the support plates and alignment funnel accordingly. A somewhat experienced driver of a vehicle would be able to park his vehicle on a given surface within a tolerance of about 4 to 10 inches. For many reasons, the struts are not unduly widely spaced from each other. On the one hand, the required surface or the lateral dimensions of a parked container are to be as small as possible. On the other hand, a large overhang increases the strain exerted upon it the structure. If, however, a driver is able to park a trailer or the vehicle itself within the mentioned tolerance of 8 to 20 inches, the alignment of the structure on a vehicular frame is ensured. It is important not to place the alignment funnel unduly high and not to let it protrude from the loading bed. Commencing at a given basic surface, the height of the funnel increases as the angle becomes more acute. An angle of 90° is preferred. About 120° represents an optimum compromise in respect of the sequence of movement and the structural height. The lower edges of the alignment funnel and the support plate form a common support plane. Accordingly, the container, if it is empty, for instance, may be placed anywhere without any support legs, stacked with other containers or transported by railroad or truck. Preferably, the support point are formed at two hollow profile transverse beams in which the legs may be mounted by insertion. Crane hooks are arranged at the ceiling of the container at two lateral planes which include the support points. Moreover, engagement surfaces for fork lifts may be arranged between the support points. In accordance with a further embodiment, a mechanically or hydraulically actuable lock engaging at the centering funnels is arranged between the platform and the vehicular frame. The placement of the transverse beams in the special transverse planes yields the great advantage of essential forces being directly diverted to the vehicular frame or ground, without affecting the superstructure, i.e. the container. The superstructure may thus be constructed in a lighter fashion.

DESCRIPTION OF THE SEVERAL DRAWINGS.

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read with reference to the appended drawings, in which:

FIG. 2a depicts different dispositions of a strut during lowering or hoisting on enlarged scale;

Figure 3:
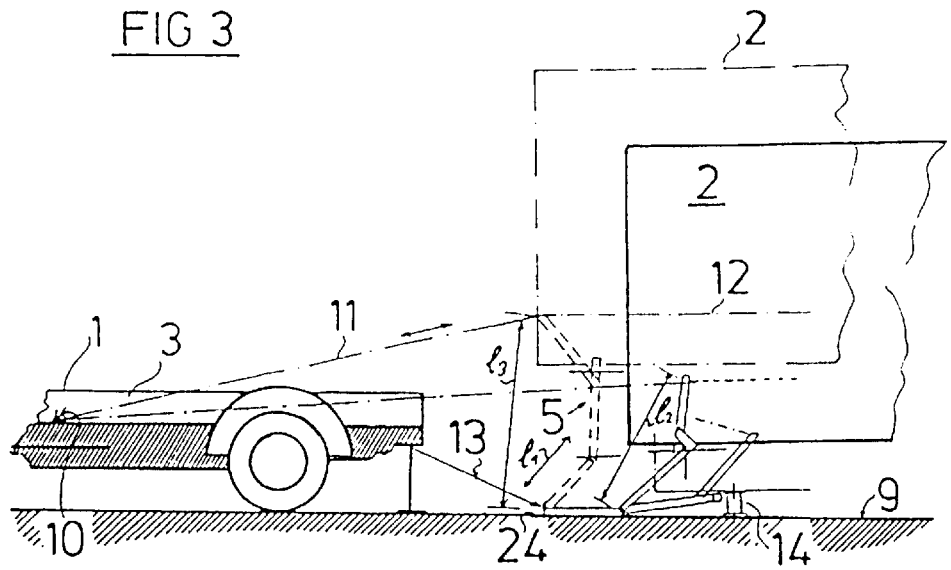

FIGS. 2b; 2c depict force diagrams for two extreme positions;

FIG. 3 the auxiliary pivoting means of a vehicle during operation;.

Figure 4:
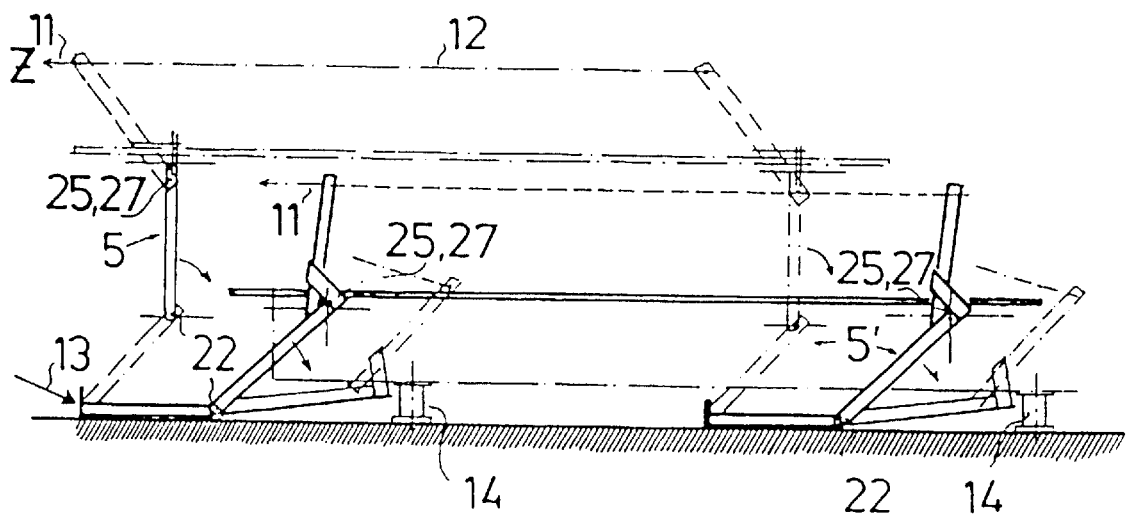
Figure 5A:
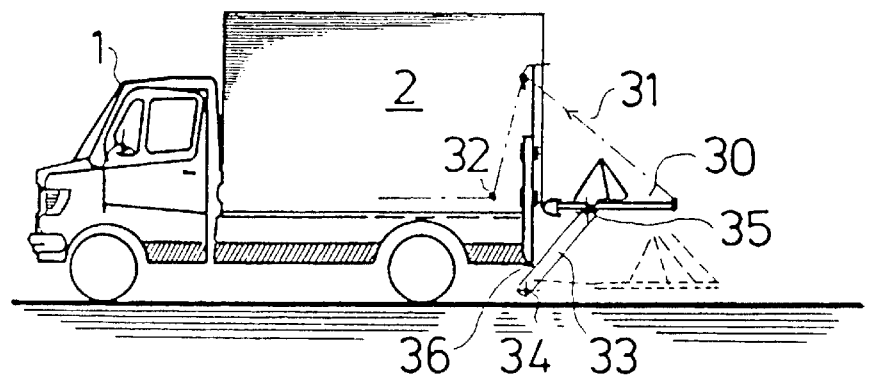
Figure 5B:
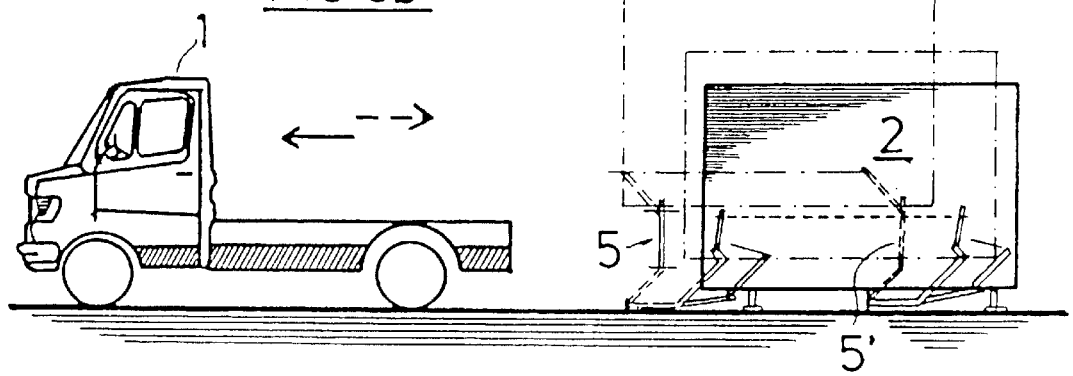
Figure 5C:
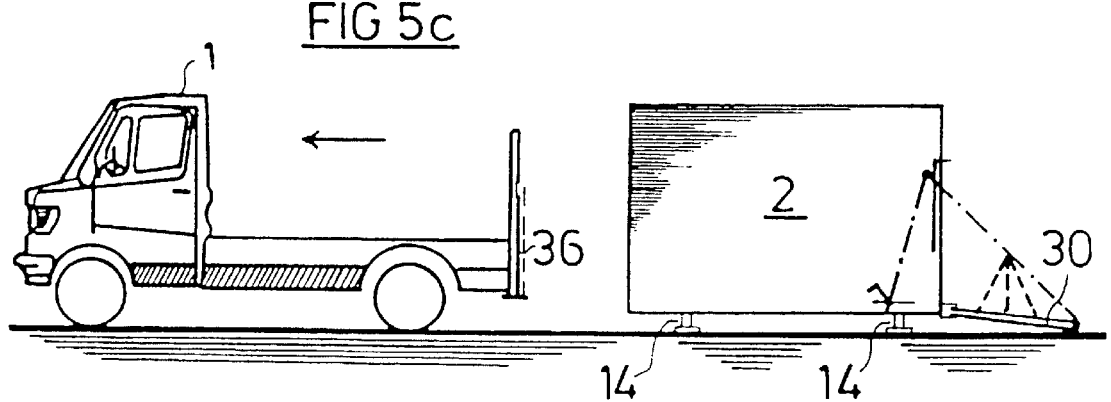
Figure 8:
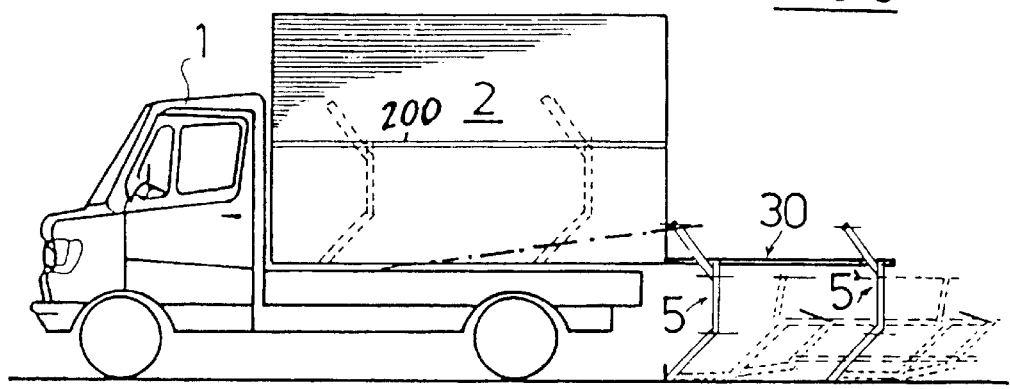
Figure 17A:
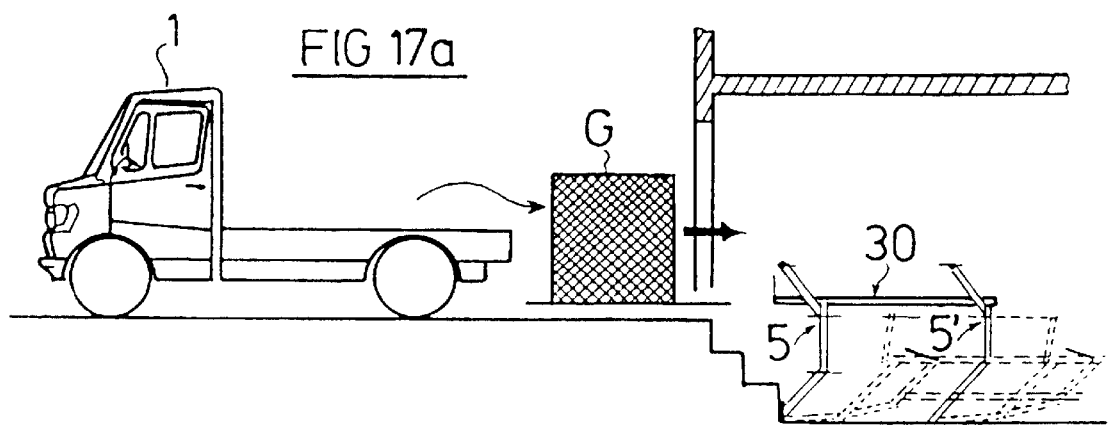
Figure 17B:
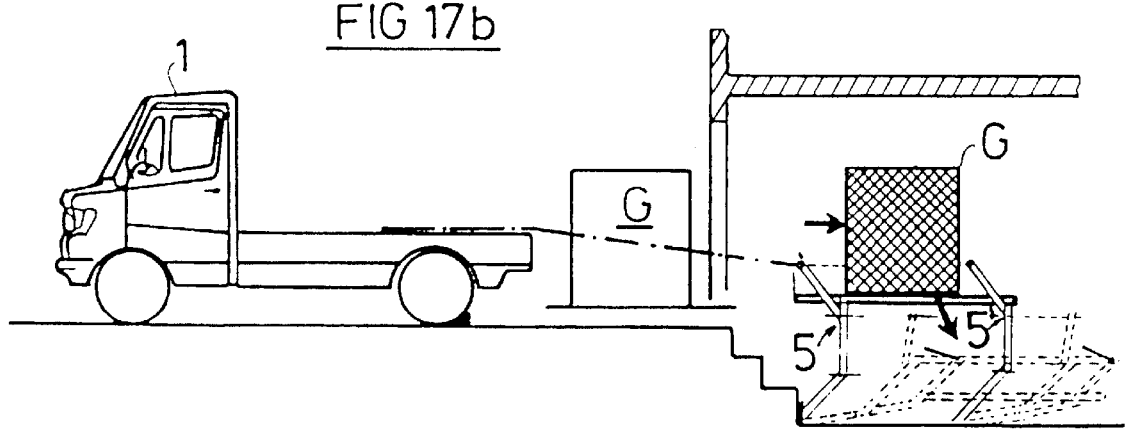
Figure 9A:
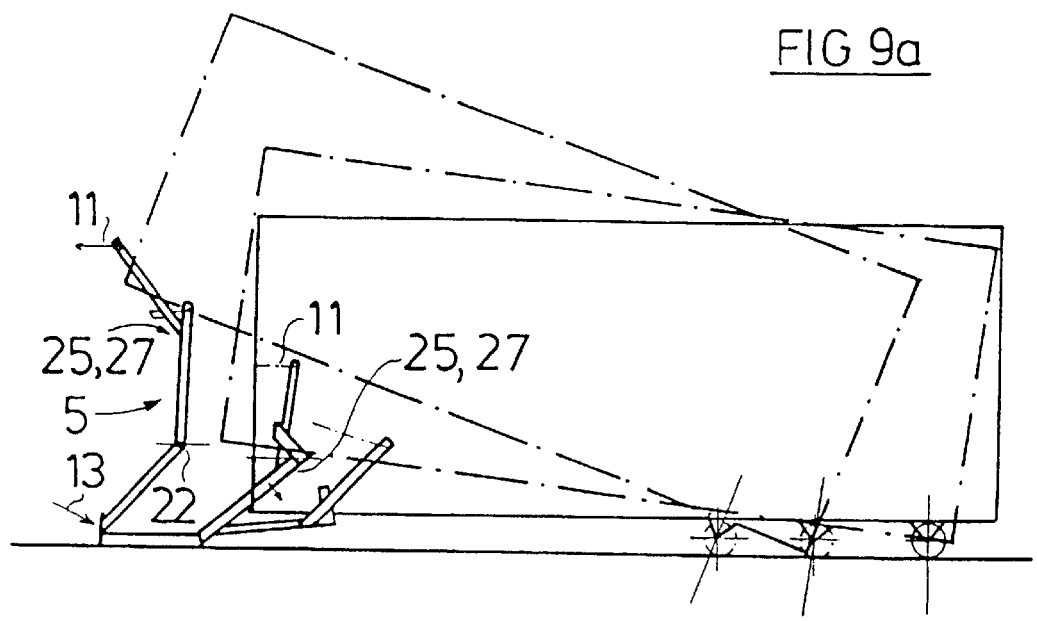
Figure 9D:
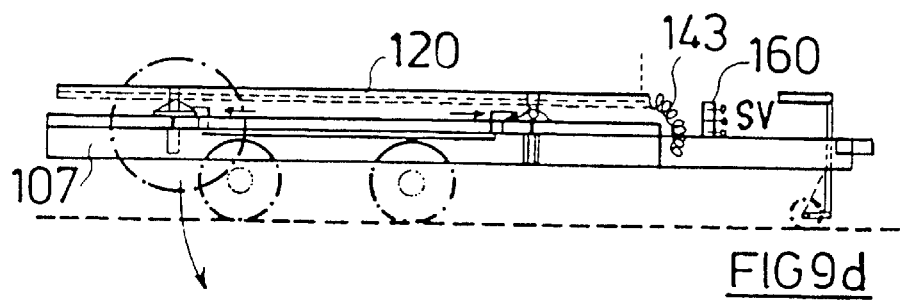
Figure 9C:
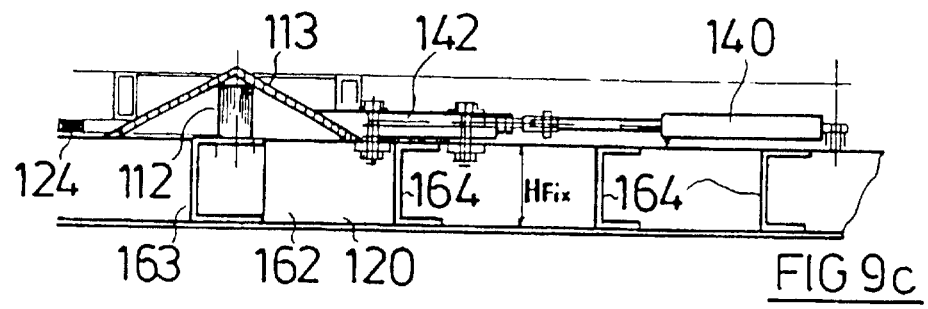
Figure 9B:
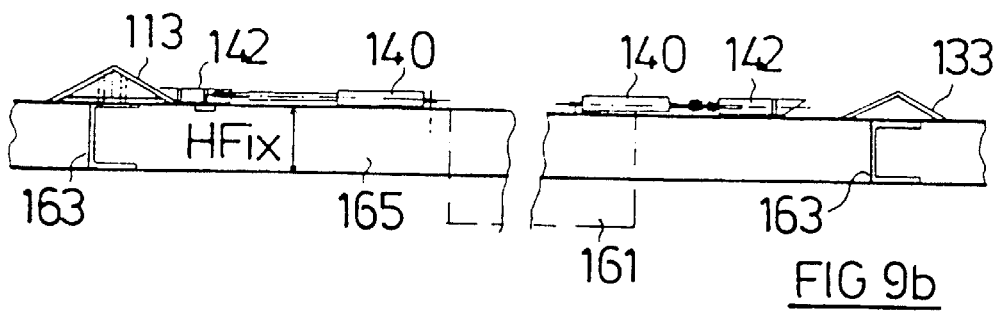
Figure 12A:
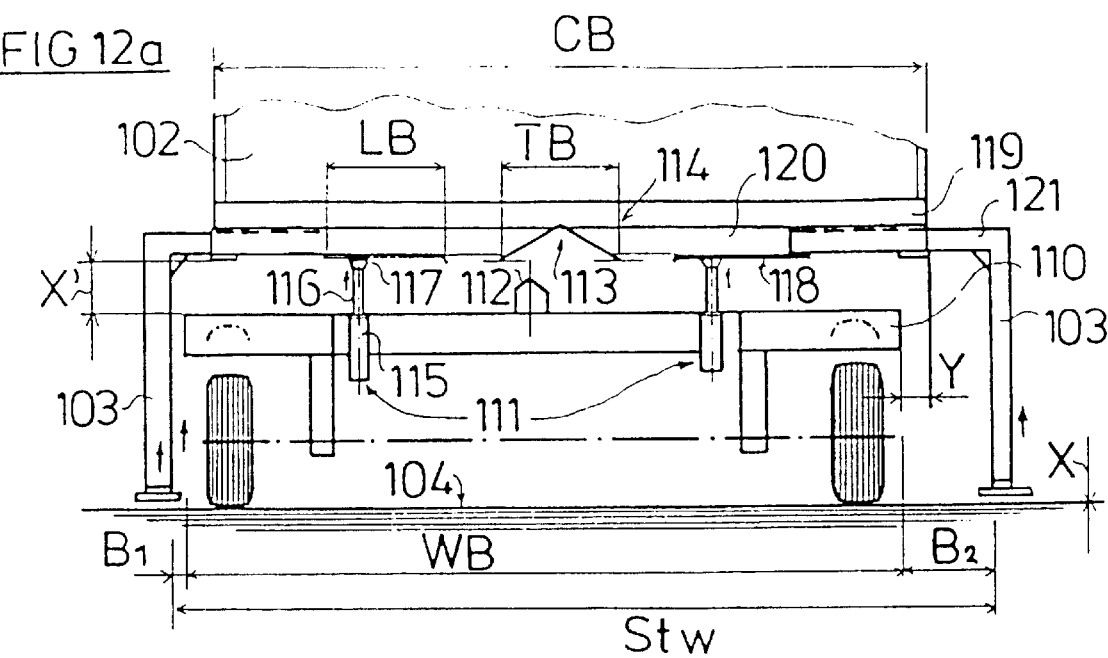
Figure 15C:
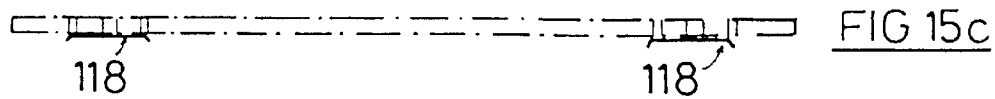
Figure 15B:
Figure 15A:
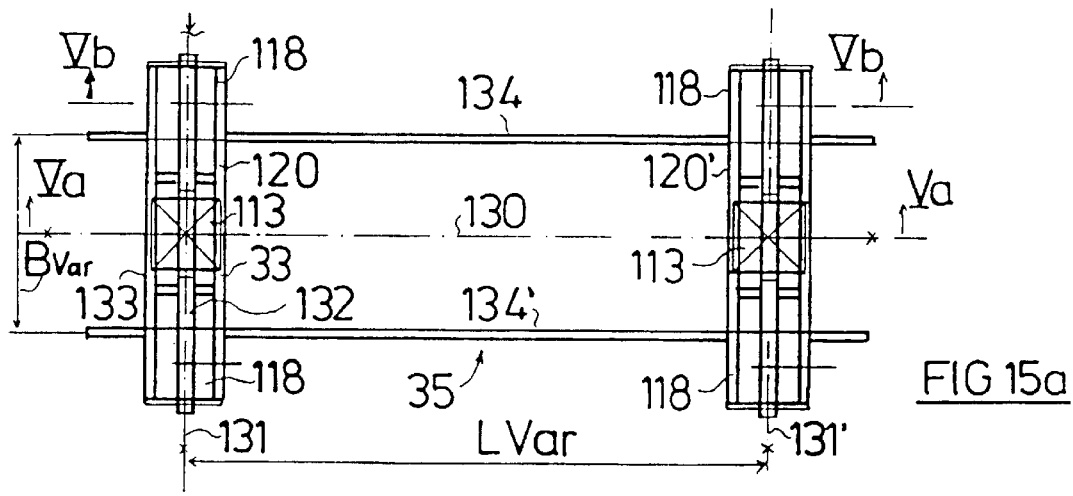
Figure 15D:
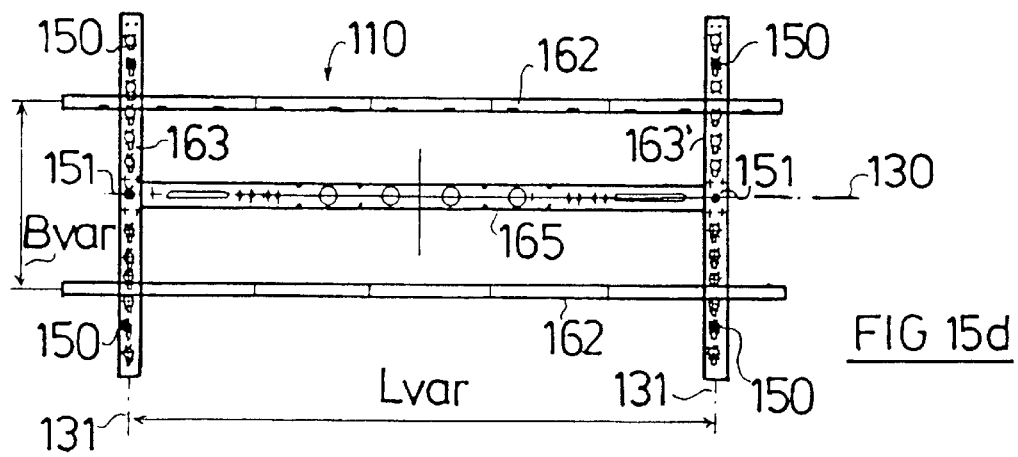
Figure 16:
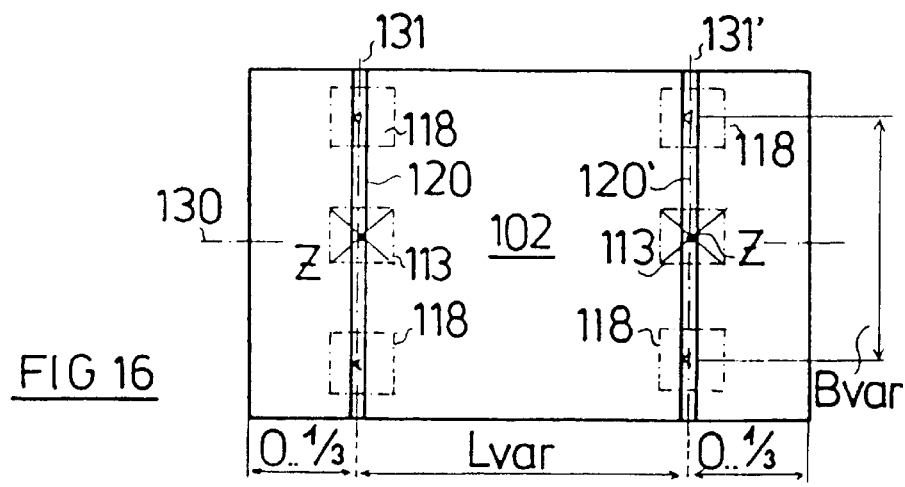

FIG. 4 depicts the use of change-over support s for a platform, for instance as an intermediate deck in a container (FIG. 8);

FIG. 5a depicts a combination with tailgate;

FIG. 5b depicts the initial position for lowering or hoisting;

FIG. 5c shows a lowered container provided with a tailgate in a position as an entrance ramp;

FIG. 6 depicts a ground support configured as a roll-off rail or skid;

FIG. 7 depicts a ground support with many joints;

FIG. 8 depicts three dispositions of a platform within a container which may be lowered to the ground or used as a loading ramp;

FIG. 9a depicts the manner in which the struts may be used for unilaterally hoisting a container;

FIGS. 9b;; 9c; 9d are various presentations of the securing of the transport structure on a vehicular frame;

FIGS. 10a; 10b; 10c depict three dispositions of foldable supports;

FIGS. 11a; 11b; 11c depict various applications of the novel solution;

FIGS. 12a; 12b; 12c depict three disposition during placement of a structure onto a vehicular frame;

FIG. 13a shows the action of two alignment funnel and centering cone combinations relative to the longitudinal axis;

FIG. 13b depicts various positions of a centering cone relative to a single alignment funnel;

FIGS. 14a; 14b; and 14c depict different dispositions during lowering and mounting of a structure onto a vehicular frame;

FIG. 15a is a top elevation of a transverse support unit as a structural module;

FIG. 15b is a section along line Va;

FIG. 15c is a section along line Vb of FIG. 15a;

FIG. 15d is an example of modular construction;

FIG. 16 is a schematic elevational view of a simplified transverse beam structure;

FIGS. 17a and 17b schematically depict the use of the folding supports for lowering and hoisting heavy loads on a platform.

DETAILED DESCRIPTION OF THE PREFERRED EMBODIMENTS.

Figure 1A:
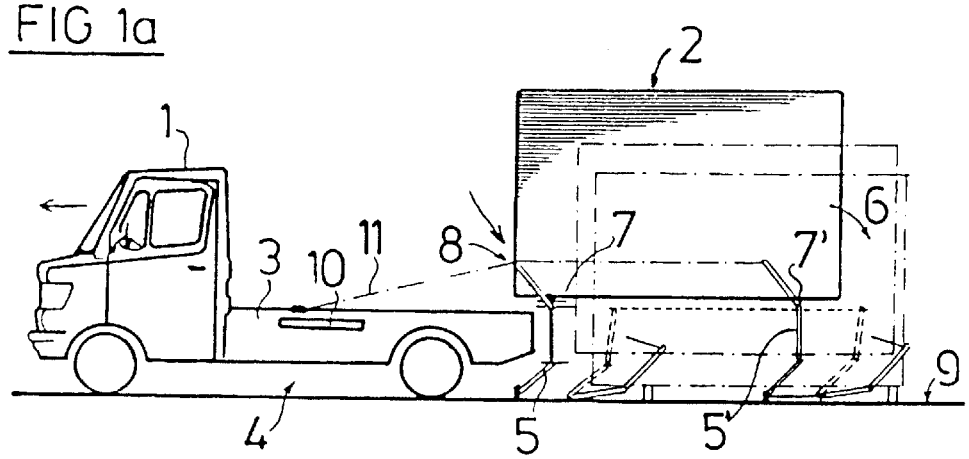
FIG. 1a depicts the situation immediately prior to lowering a container.
Figure 1B:
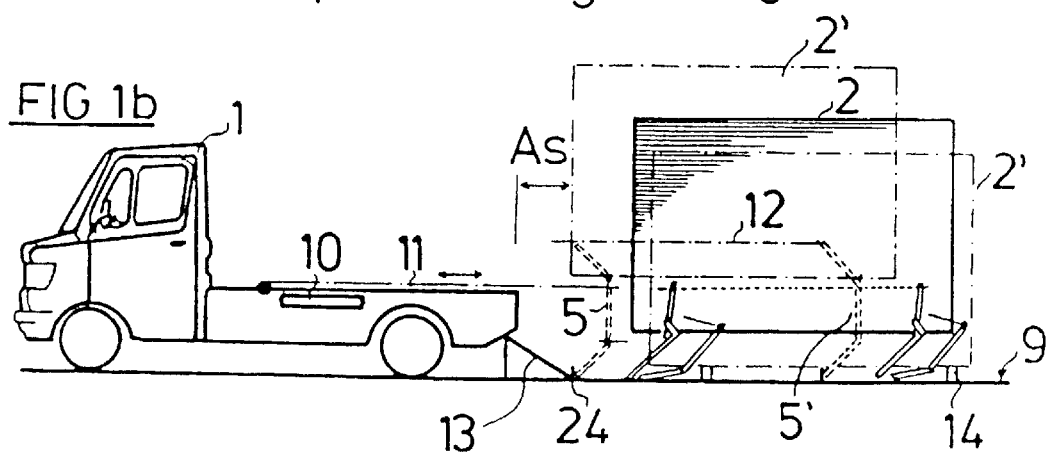
FIG. 1b depicts different dispositions of a container to be lowered to the ground.
Figure 1C:
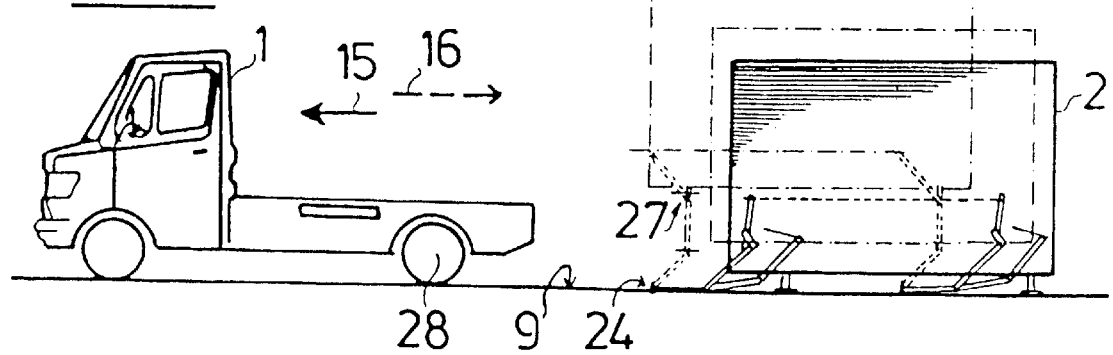
FIG. 1c depicts the termination of the lowering to the ground.

Reference will hereafter be made to FIGS. 1a to 1c which depict a motor vehicle 1 having a frame 4 for supporting a superstructure shown as a container 2. The motor vehicle is provided with loading bed 3 of the kind described, for instance, in WO97/13564. As regards corresponding structures and variations thereof, reference is made to the WO publication in its entirety. The publication is also to be referred to as regards the containers 2 and their construction in terms of intended or present use. The structure may, for instance, be a loading bed with or with a covering structure. It is essential that upon demand the container may quickly be removed from the vehicle to a parking position and vice versa. However, the novel arrangement may be used independently of an aligning funnel and centering cone combination. Only one side of the container 2 is shown in each of FIGS. 1 to 6. In reality, as indicated in FIG. 7, an identical strut configuration is provided at the opposite side of the container. FIG. 1*a* depicts a disposition in which the change-over from a vehicle to a parked position according to U.S. application Ser. No.: 09/051,328 has already been completed. The container 2 rests on change-over supports 5, 5', i.e. a total of four ground posts, and is thus in an elevated position. If it is intended to keep the container in the shown elevated position for some time, it is recommended to use simple support legs as shown in U.S. application Ser. No.: 09/051,328, that is to say simple, straight and vertical support struts. With struts of the kind shown in FIG. 1*a* the entire container 2 has a strong tendency to drop in the direction of the arrow 6, toward the right side of the drawing or to its rear, since every strut is pivotally connected to the container 2 by a hinge pin 7, 7'. At least one and, preferably, two change-over supports 5 will be blocked against pivoting relative to the container 2 by an arresting member 8. This is the case, in particular during the short interval of change at which the container is lowered to a parked position. As soon as the container has been moved into the highest possible position in accordance with U.S. application Ser. No.: 09/051,328, and after the change-over supports have been attached to the container, or have been lowered, they will be secured. Such securing is important, but may be accomplished in a manner different from the one indicated in FIG. 1*a*.

In FIG. 1*b* the motor vehicle 1 has been moved away from the container 2 by a distance $A_s$. Auxiliary pivot devices 10 structured, for instance, as hydraulic cylinders, are mounted on the loading bed 3, from which a traction cable 11 may be connected to the change-over supports 5.

FIG. 1*b* depicts the container 2 (in solid lines) in an intermediate lowered position, with the container always remaining in a disposition parallel to ground. The highest or lowest positions the container 2 may assume are shown in dashed line 2', 2". The change-over supports 5, 5' are provided with a parallel link 12 for coordinating the pivoting movement of the struts. In order to prevent the vehicle 1 from being pulled towards the container 2 or the container from being pulled towards the vehicle 1, instead of the container 2 being lifted or lowered, a shift lock 13 is arranged between the vehicle 1 and the container 2. In the case of relatively light containers the shift lock 13 may be a thin shaft mounted on the vehicle or the loading bed such that when not in use it is secured on the vehicle. When in use the shift lock 13 may be brought to abut against the two nearest change-over supports 5. Preferably, the container 2 is provided with short feet 14. The feet 14 may be structured as resilient feet such that they absorb the kinetic energy of the final segment of the lowering movement of the container 2 and function as an energy storage for facilitating a subsequent lifting operation. In accordance with a further embodiment of the invention the feet 14 may also be structured as casters so that, especially in connection with light containers, movement may be facilitated. As shown in solid lines in FIG. 1*c* the container 2 has been lowered completely to ground. The vehicle 1 thereafter available again for other operations as schematically indicated by arrow 15. Arrow 16 depicts the reverse condition in which the vehicle 1 approaches the container 2 in order to load it again.

FIG. 2*a* depicts an change-over support 5 in three different positions in a curved path of movement of the container 2. To the left it is shown in an upright position, to the right thereof it is partially or completely lowered as shown as $5^x$ and $5^{xx}$. The change-over support consists of a lower leg 20 and an upper leg 21 connected to each other by a joint 22. The legs 20, 21 may be moved into an angular disposition relative to each other. The angular disposition is limited, however, by abutments 23, 23', so that the obtuse angle a may not be exceeded. The angle $\alpha$ is always larger then 90°, but it is less than 180° under a load. The lower leg is provided with an abutment 24 which touches ground first. The upper leg 21 is pivotally connected to the superstructure or container 2 by a bearing pin 25. Hence, the two legs may be pivoted about bearing pin 25 in the direction of arrow 26. The rotary axis 27 of the bearing pin 25 is disposed in parallel to the axles 28 of the vehicle 1 as shown in FIG. 1*c*. Accordingly, movement of the vehicle, of the traction cable 11 and of the struts 5, 5' thus occurs in the same plane. In every position, the bearing pin 25 is displaced relative to the abutment or support point 24 by a distance x in the direction of the point of gravity S of the container. Accordingly, when the container 2 is in its elevated position on the ground posts 5, it tends to drop off in the direction of arrow 28. Therefore, it is necessary to prevent the ground posts 5 from pivoting in an uncontrolled manner. This is accomplished by arresting a traction arm 30 at the container 2 in a lock 29. Up to the position shown and limited by an abutment 31, the traction arm 30 may be rotated about the bearing pin 25 in a clock-wise direction. A cable hook 32 for attaching the traction cable 11 is provided on the traction arm 30. The lowering movement is carried out by the change-over support 5 moving about the support point 24 in a clock-wise direction. During the initial lowering phase the angle $\alpha$ remains unchanged. The forces are absorbed by the traction cable 11 on the one hand and by the support point 24 of the change-over support on the other. As indicated by radius R, the support point 24 is rounded. $5^x$ depicts the condition at which the initial lowering phase has been terminated. The lower leg 21 lies completely against ground 9. Further lowering takes place by rotation of the upper leg 21 about the joint 22. The lowering movement may continue until the upper leg 21 also lies completely against the ground 9 or, as shown in the drawing, until the container rests upon its feet 14. Once the container 2 rests on its feet 14, there is no further need for the change-over supports 5, 5'. The change-over supports 5, 5' may be removably structured so that they may be folded and placed into the vehicle or into the container. The leg configuration shown offers the advantage of the lowering or lifting movements being carried out by lever action with relatively small traction forces.

FIGS. 2*b* and 2*c* depict, in correspondence with FIG. 2*a*, two container positions during a lowering or lifting movement with effective lever lengths. FIG. 2*b* shows a low position which in respect of a required lever force is unfavorable. In FIG. 2*b*, the entire weight is moved about fulcrum $D_1$. Hence, the resultant power arm $KA_1$ relative to the load arm $LA_1$ is longer, the weight of the load being indicated as G. Because of the effective lever action, the requisite traction force $Z_1$ is relatively small. In FIG. 2*c* a change has occurred in the sense that movement is now taking place about fulcrum $D_2$. The load has already been lifted. In the depicted position a less favorable length ratio of $KA_2$ to $LA_2$ results. This is of no disadvantage, however, as the requisite force of movement $Z_2$ is now only a fraction compared to the position of FIG. 2b where the maximum required lever force is shown.

The length of the levers $I_1$, $I_2$ and $I_3$ relate to each other in accordance with the lever principle as shown in FIG. 3. FIG. 4 correspondingly shows the coordinated movement of the change-over supports 5 and 5' for an intermediate deck in a container.

For many goods it is of advantage to provide not only one, but two or more platforms which may be similarly used and handles when the upper one is lowered, as is well known from automobile transportation.

FIGS. 4 and 8 depict applications in connection with a platform $20_X$.

FIGS. 5a, 5b and 5c depict further embodiments. In many cases goods are transported on pallets, for instance, with each pallet weighing from about 220 to about 660 pounds. Such weights cannot be by a person without auxiliary means. The proposed container concept basically provides for loading the container at a point of departure and unloading it at a point of destination. While intermediate removal of individual cargo pieces is possible, the operation is, nevertheless, complex, since with heavy pieces the entire container has to be lowered to ground each time unless auxiliary means are provided. In every advantageous embodiment, a vertically movable platform 30 is provided laterally of the container or at the rear thereof, which may be lowered by a traction cable 31. The traction cable 31 may be pulled by a hand crank 32 or directly by a traction cable 11 of the kind referred to supra. The platform 30 may be raised and lowered by a rotating arm 33 connected at one end to a joint 34 at a brace 36 and at its other end to a joint 35 at the platform 30. The platform moves from its horizontal position (solid lines), supported by the fulcra or joints 34 and 35 as well as the traction cable 31, downwardly, or in reverse during an upward movement. FIG. 5b depicts the change-over in accordance with the invention of the entire container; FIG. 5c depicts the further possibility of utilizing the platform 30 as a loading ramp.

FIG. 6 depicts a bottom support 5 structured as a roll-off rail or skid 40.

FIG. 7 depicts a further embodiment of the ground support 5 provided with a plurality of joints 50 to 55. A transverse beam 60 schematically shown in FIG. 3 may be engaged by one or two shift locks 13. Preferably, however, the shift lock 13 engages abutment surfaces 24. FIG. 8 depicts the use of ground supports for lowering a platform, instead of the structure shown in FIG. 5a.

FIG. 9a depicts a further possibility. Large containers for heavy goods have been accepted widely. Such containers are pulled onto a truck in the manner of a sleigh by means of a hook. The present embodiment makes it possible unilaterally to lift the container off the ground by means of only two ground supports, and thereafter to pull it onto a truck. The ground supports may be arranged in front or at the rear and lifting may take place by a winch and hook of the truck.

FIGS. 9b, 9c and 9d depict a loading bed with a platform 120 mounted on a vehicle frame and, beneath it on an enlarged scale, a safety system. A carbine safety is actuated at both sides by a double-action cylinder 140. A locking wedge 142 extends into the inclined surface of a centering funnel 113 and secures the connection between platform 120 and vehicular frame 107. Furthermore, an additional chain-operated safety device 143. The clamp safety or wedge is of the significant advantage in that enormous forces may be generated by the hydraulics and that in many cases the container may be pushed into its centered position with accuracy in the millimeter range. This makes it possible to provide an additional safety structured as bolts or wedges manually inserted into the periphery of the loading bed. FIGS. 9b depicts the forward and rear bilateral engagement of the latch. FIG. 9c is an enlargement of a side of a latch. The cooperation of all contacting elements is important, such as of the many supporting points by intermediate damping layers 124 and, more particularly, however, of the double wedge action of a centering cone 112 in the interior of the engaging funnel 113 and of the locking wedge 142 at the exterior of the engaging funnel. The control and latching functions SV are actuated from a control box 160 which preferably is connected to the electrical system of the vehicle. In the example shown the lifting and lowering device is provided with hydraulic cylinders which are supplied with a pressure medium from a hydraulic unit 161. All valves as the well as actuation and shutting down thereof are controlled from the control box 160. Further latching may be provided in the vehicle, for instance for preventing the vehicle from escaping if basic functions have not been performed or terminated in a predetermined manner. The movable elements of the safety system are connected to the vehicular frame of the loading bed and remain part of the vehicle. Hence, it is possible to service many identical cost-efficient containers with the movable parts, motorized means and the controls of but one motor vehicle.

In FIGS. 10a to 10c there are shown different positions of a change-over support structured as a foldable strut or rocker arm support. FIG. 10a is a view from the side of the transport structure, i.e. from the interior thereof. FIG. 10a represents the operating or working position. By comparison, FIG. 10c depicts the ground support folded up as a package, so that when idle the folding supports may be stored in the smallest possible space, e.g. under the transport structure or at the vehicle. Where the change-over support is intended for use with a load of no more than a few tons, its basic elements may be made of a light metal for facilitating manipulation. Depending upon a given situation, the change-over supports may be affixed in a secure location of the transport structure, in their folded-up condition. FIG. 10b shows the change-over support 5 in an extended state which may either be the initial condition for loading of the transport structure or, in reverse, for unloading. Accordingly, the traction arm 30 and the lower leg 20 are pivoted in either a clockwise or anti-clockwise direction, as shown by arrows 70 and 71. In an upper portion of FIG. 10a a joint axle 72 is also shown for mounting on the transport structure itself, for instance in a hollow profile beam 132 (FIG. 15). The joint axle may also be quickly mounted on and dismounted from the transport structure, similar to support legs 103 (FIG. 12), or, optionally, it may remain mounted in a secure condition on the transport structure. It is entirely possible, to utilize either vertical ground supports, 103 or foldable supports depending on a given situation. The ground supports 103 (FIG. 11a) are rather more suitable for use in long term parking, whereas the foldable supports are useful for changing from an elevated position into a lower position or if the elevated position is to be maintained for a short period only. The joint axle 72 is provided with an extension 73 for facilitating rotation when in a mounted state, and with a solid shaft 74 for insertion into a complementing guide of the transport structure. A predetermined position in the elevated state may be secured by a latch 29 (for arresting) and, optionally by an additional spring. In this manner, the transport structure may remain in its elevated position for a certain time. Furthermore, the upper leg 21, in its mounted state, is secured against shifting toward the interior by a spacer 75 and by a plinth or bolt 76 on the rotary pin 25. In the upper leg 21 there is provided a bore 77 in which the rotary pin 25 is journaled with sufficient play. The ground supports, too, are conceived in this manner with reference to a modular construction. The utilization of individual modules may be defined in accordance with actual requirements. The latch 29 acts in concert with a safety bolt 29' as a rotational safety. In this manner the transport structure may be secured in an elevated position, at least for the time it takes to transfer cargo or changing positions (from parking to vehicle).

Reference will hereafter be made to FIGS. 11a, 11b and 11c. The structure shown in FIG. 11a is a recreational vehicle, whereas in FIG. 11b it is an ordinary container. FIG. 11a depicts a camping trailer 102 which may be unloaded from its vehicle 100 and left behind on change-over supports 103. A light vehicle 100 depicted to have two axles may be of the type known under the names of Mercedes Sprinter, VWLT35, Ford Transit, IVECO and so on. To the left of it, there is shown a structure such as a container 102 supported on the ground 104 by struts 103. An arrow indicates that the vehicle 100 is about to move the rear portion of its frame 107 under the container 102. The container 102 is thereafter affixed to the frame 107 as will be described in greater detail hereinafter. Arrow 108 symbolizes the completely assembled vehicle ready to drive away. FIGS. 11b and 11c depict two further possible applications, i.e. transportation by the vehicle itself or by a trailer, and FIG. 11b shows the possibility of transportation by either method. Transportation with a trailer 109 is of great advantage in that, within permissible load limits, it may be towed by a passenger car or by a Jeeps.

Figure 12B:
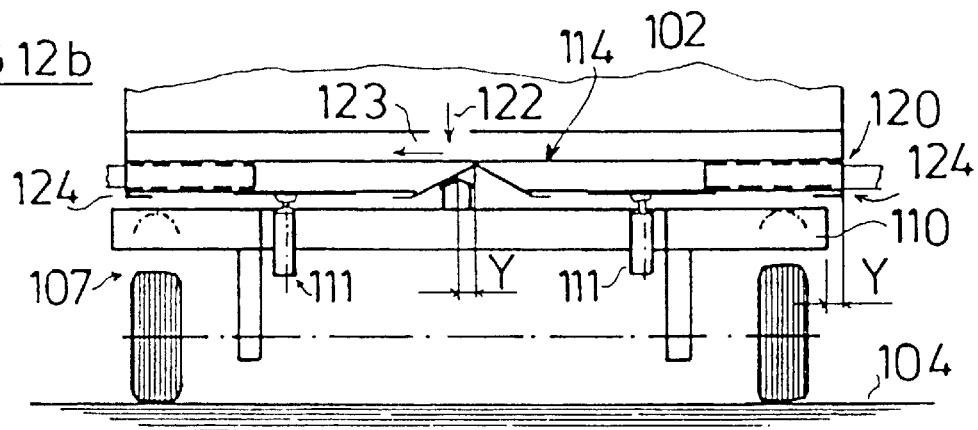
Figure 12C:
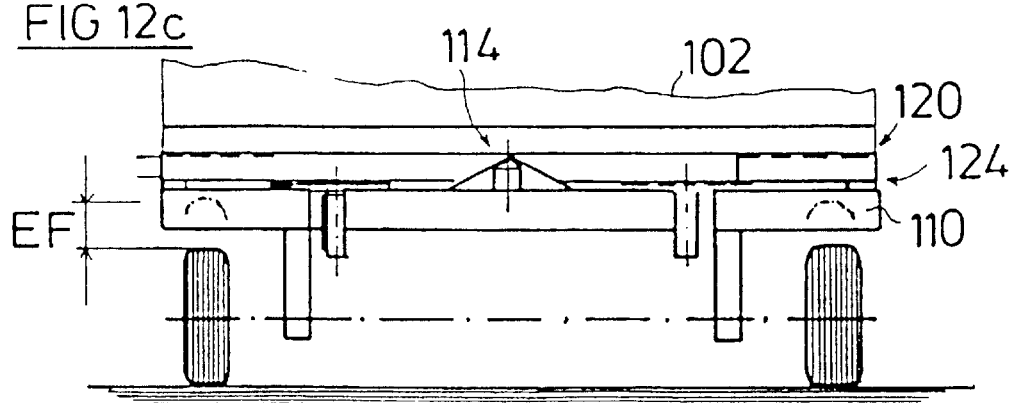

FIGS. 12a, 12b and 12c depict three different positions beginning with an initial lowering movement of the container 102 to its being loaded on a vehicular frame. At the same time, FIG. 12a represents the termination of the lifting movement of the container from its support on the ground by struts 103. The upper portion of the vehicular frame is provided with a loading bed 110 which constitutes an intermediate member between the actual vehicular frame and the elements for carrying out the exchange. These elements consist of a lifting and lowering device 111 as well as a centering cone 112. Together with an engagement funnel 113 the centering cone 112 forms an engagement funnel and centering cone combination 114. The lifting and lowering device 111 consists of a plurality, preferably four, hydraulic cylinders 115 for supporting the structure 102 by a piston rod 116 and a piston rod head 117 and support plates 118. The structure is provided with a platform 119 provided at its lower surface with a transverse beam 120 to which the engagement funnel 113 as well as two shift and support plates 118 are attached. The transverse beam 120 may be structured as a hollow profile into the two outer ends of which a horizontal support 121 may be connected or inserted. The horizontal support is part of the vertical posts 103. The posts 103 are lifted off the ground by a small distance X which is smaller than the space X' between the loading bed 110 and the support plate 118 of the structure. The difference corresponds to the resilience of the loading bed 110 on the vehicular frame 107. In the position according to FIG. 12b the posts 103 may be removed or rotated by 900 into a horizontal disposition or by 180° into a vertical disposition. The structure 102 or the entire container 102 will then rest completely on the lifting and lowering device 111. The lowering movement may now commence. The piston rods 116 are quickly withdrawn and the entire structure 102 is lowered in correspondence therewith until the tip of the centering cone 112 contacts the engagement funnel 113 (FIG. 12c). The centering cone 112 in its simplest form may be a body of solid iron with a conical tip and rigidly mounted to the vehicular frame or loading bed. However, the centering cone may also be mechanically movable; i.e. it may be structured as a movable piston to serve other functions as well. The main functions of the centering cone 112 are to reject the engagement funnel 113, centering of the engagement funnel 113 and, finally, securing the structure in its centered position. The arrow 122 in FIG. 12b indicates the vertical movement of the structure in a downward direction. The arrow 123 indicates the horizontal shifting movement generated by the rejection between centering cone 113 and the corresponding inclined surface 125' of the engagement funnel (FIG. 14). In spite of initial doubts, all practical applications have thus far shown that the decisive sequence of movement from the position of FIG. 12b to the position of FIG. 12c is best performed if the operation takes place quickly. Provided the sequence does not involve an artificially induced stand-still, the operation is not abrupt. The sequence of movement is enhanced on the part of the vehicular frame by its resilience and on the part of the container by its movability with many degrees of freedom, so that the container tumbles or slides into its precise position. It may be advantageous to apply a friction reducing material to the support plates 18 or the piston rod head 117. Preferably, damping intermediate layers 124 are provided between the loading bed 110 and the platform 119 so that for a journey the structure rests securely at many positions on the intermediate layers on the vehicular frame.

A further important aspect of the novel invention is apparent in FIGS. 13a and 13b as well as FIGS. 14a and 14c, namely the size of the shift plate and of the engagement funnel. It is assumed that the greatest width of the vehicular frame WB and the greatest width CB of the container are about equal. The free width between the posts Stw, therefore, exceeds by a measure $B_1$ and $B_2$ (FIG. 12a) the space available to a driver for parking the vehicular frame below the structure 102. The width LB of the support plates 118 and the width TB of the engagement funnel are about equal and each about the same size as the sum of $B_1$ and $B_2$. In practical application, the measure will be between about 47 inches and about 20 inches. This is of great advantage in that each parking position within the free width Stw between the posts leads to the same result of an accurate placement on the vehicular frame. As shown in FIG. 13b, the same problem occurs in the transverse as well as in the longitudinal direction of the vehicle. FIG. 13b indicates that the funnel is provided with four slide surfaces 125, 125', 125", 125'''. Each of the inclined slide surfaces 125 causes the centering cone to move to the center position Z (FIG. 14c). The angle a is preferably selected to be larger than 90° and, optimally, in the range of 120°. G indicates the weight of the container. The more the weight of the structure or container is shifted during lowering away from the supports to the engagement funnel the larger is the lateral shifting action S on the container. The shifting action S causes the shift or support plates 118 to slide over the piston rod heads 117. Shifting, therefore, is the result of the combined action of the engagement funnel and the flat planar shift plates. If, merely as a theoretical consideration, the entire structure were momentarily supported on the tips of the two centering cones and all piston rods were downwardly withdrawn the result would be a completely unstable condition of the container. The container would inevitably lean toward one side or the other and result in a lateral sliding movement. A slight shaking would occur which would facilitate the sliding movement. The engagement funnels may be of a configuration different from the simple pyramidal one, for instance of rounded guide surfaces. The engagement funnel serves the actual function of leading the structure into a centered secure position for a journey on a road. A lubricant $G_L$ may be applied to the slide plate or to the support point of the piston rod 116 or piston head rod 116'.

FIGS. 15a, 15b, 15c and 15d as well as 16 depict a container module of a transverse support group and the symmetric arrangement of the discussed elements relative to each other. An optimum arrangement resides in placing the two engagement funnels 113 in the longitudinal axis of symmetry 130 of the container. This results in optimum toggle and shifting forces or similar or identical conditions in all four directions (lateral and longitudinal). In respect of the transfer of force or effect on a container of light construction, it is recommended to arrange two support plates 118 and an engagement funnel 113 fore and aft in common transverse planes 131 and 131'. This also applies to complementary parts, centering cones and lifting and lowering device or their four hydraulic cylinders. For larger dimensions in particular it is desirable to construct the transverse support 120 from a center hollow profile 132 and two lateral profiles 133. Both transverse supports 120 and 120' are connected by two elongated connectors 134, 134' and form a transverse structural support unit or structural module 135 which may be bolted to the loading bed or the floor, for instance a wooden floor, of a container. To provide for a good force distribution, the two transverse beams 120, 120' should be arranged within the outer third or outer fourth section of the container. The terms front and rear refer to the driving direction but are of no importance in connection with a completely symmetrical structure. The transverse supports as standard units and the connectors 134 may be adapted to individual types or sizes of vehicles. However, a standard dimension is optimal for both directions. Independently of their structural composition the transverse supports preferably each form a transverse axle or beam 131 or 131' or transverse planes 131, 131'. FIG. 15d depict an individual loading bed module. The position of its bearing points 150 and of their centering points 151 is fictitiously shown. The centering points 151 are located in the axis 130 of longitudinal symmetry. A transverse axle 131' or 131 and support points 150 are positioned fore and aft, and, in the center, centering points 151. The motorized lifting and lowering device would connect at the support points and is structured for synchronous lifting or lowering of the support points. Preferably four support points are distributed over the bottom surface of the container where motorized drive means, such as pneumatic cylinders, hydraulic cylinders, air springs, spindle drives or threaded spindles are in preferably synchronously controllable engagement therewith. To satisfy higher demands for leveling the container the motors may be synchronized in pairs or individually. The lifting and lowering device may be equipped with motor driven or manually powered lever shears. The essential basic elements of the loading platform module are two elongate transverse beams 162, 162', a center support beam 165 as well as two strong cross beams 163, 163' structured as with recesses 164 for insertion. This makes it possible to assemble units of different longitudinal and transverse dimensions. The elongated beams may be adjusted to fit the longitudinal supports of the vehicle and may be rigidly connected therewith. The length $L_{var}$ as well as the width $B_{var}$ may thus be adjusted to any type of vehicle.

FIG. 16 depicts a simple structure of the transverse beam construction.

FIGS. 17a and 17b depict an interesting possibility of applying the foldable supports in accordance with the invention, for loading and/or unloading and more particularly for lowering and lifting heavy loads, for instance on a plateau, a loading ramp, a transport frame or a pallet or loading bed or, by means of appropriate beams to the load itself. Often a heavy load has to be unloaded from a transport means and must then be moved within a building through a door to a surface disposed at a level lower by several steps. Usually, horizontal movements are executed without any problems, for instance, on casters, by bushing or by pulling. However, lowering and lifting pose a great problem if, because of height restrictions, it is not possible to use a crane within the building. As may be seen from FIGS. 17a and 17b, such function may be easily performed in two steps without significant risks of accidents. A heavy load G may, for instance, be an electrical transformer. In a first step, it is unloaded to ground level. At the same time a platform with four foldable supports is erected within the building. The front feet abut against the stairs for absorbing any horizontal shifting force. If required the transport means is secured against horizontal shifting, symbolically indicated by a brake shoe. Lowering is carried out in the manner repeatedly described above. The reverse sequence arises when lifting or loading the loads. The problem may present itself at loads in excess of 220 pounds such as for instance, with boilers. The great advantage resides in the conversion of the vertical lifting function into a towing function. In all cases it is important that the foldable supports may be connected in some way, by means of beams and the like, with the load itself or with the loading bed in engagement therewith for a flawless transfer of force. In many cases the traction force may be generated by an electrical winch or by a manual winch or by a lifting aggregate.

What is claimed is:

1. A change-over support for moving a load between low and high positions, comprising:
   at least a first strut comprising a first elongated member one end of which is pivotally supported in a plane disposed substantially in the low position, a second elongate member connected at one end to a second end of the first elongated member for limited pivotal movement in a predetermined direction and a third elongated member connected at one end to a second end of the second elongate member for limited pivotal movement in the predetermined direction;
   means at the connection between the second and third elongated members for supporting the load; and
   means for connecting a second end of the third elongate member to means for exerting thereon a tractive force for pivoting the first, second and third elongate members in the predetermined direction whereby the first, second and third elongated member comprise a force arm and the first and second elongate members comprise a load arm and the ratio of force arm to load arm diminishes during the movement in the predetermined direction.

2. The change-over support of claim 1, further comprising abutment members at the connections between the first and second and second and third elongated members to limit the pivotal movement thereof to >90° and <180°.

3. The change-over support of claim 2, further comprising at least one second strut provided with first, second and third elongated members mounted for substantially coaxial pivoting movement with the first, second and third elongated members of the first strut in a first plane common with the first strut.

4. The change-over support of claim 3, further comprising at least third and fourth struts mounted for substantially coaxial pivoting movement in at least one other plane substantially parallel to the coaxial movement of the elongate members of the first and second struts.

5. The change-over support of claim 4, wherein the struts in the first plane are mechanically connected to the struts in the at least one other plane for coordinating the movement thereof.

6. The change-over support of claim 5, wherein the means for supporting the load comprises a substantially planar surface.

7. The change-over support of claim 6, wherein the planar surface comprises the bottom of a housing.

8. The change-over support of claim 1, wherein the means for exerting a tractive force comprises a cable.

9. The change-over support of claim 8, wherein the low position is a storage space and the high position is a loading bed and wherein the cable is provided on a winch associated with the loading bed.

10. The change-over support of claim 9, wherein the loading bed is mounted on a vehicle and wherein means is provided for maintaining a predetermined space between the vehicle and the change-over device when the tractive force is exerted.

* * * * *